United States Patent [19]

Buzzio et al.

[11] Patent Number: 4,793,674
[45] Date of Patent: Dec. 27, 1988

[54] FIBER OPTIC COUPLER USING FRIT

[75] Inventors: Beth A. Buzzio, Rutherford; Eugenia M. Viera, West New York; Christine M. Flaherty, Upper Montclair; Arlene C. Isea, Mountainside; Herbert T. Califano, Bloomingdale; Joseph P. Pierry, Park Ridge, all of N.J.

[73] Assignee: Allied-Signal Inc., Morris Township, Morris County, N.J.

[21] Appl. No.: 4,354

[22] Filed: Jan. 16, 1987

[51] Int. Cl.$^4$ .............................. G02B 6/26; G02B 6/42
[52] U.S. Cl. ................................. 350/96.11; 350/96.15; 350/96.20
[58] Field of Search .................. 65/3.11, 42, 43, 36; 350/96.11, 96.15, 96.20

[56] References Cited

U.S. PATENT DOCUMENTS

| 3,579,316 | 5/1971  | Dyott et al.    | 350/96.15 |
| 4,002,799 | 1/1977  | Dumeshil et al. | 65/43     |
| 4,054,366 | 7/1976  | Barnoski        | 350/96.15 |
| 4,550,974 | 4/1985  | Murphy          | 350/96.15 |
| 4,593,968 | 6/1986  | Giallorenzi     | 350/96.15 |
| 4,632,513 | 12/1986 | Stowe et al.    | 350/96.15 |
| 4,666,234 | 5/1987  | Emkey           | 350/96.15 |

OTHER PUBLICATIONS

W. K. Burns, M. Abebe and C. A. Villarruel—"Parabolic Model for Shape of Fiber Taper".
V. A. Handerek, R. B. Dyott—"Spie" Proceedings vol. 574 Aug. 1985.
W. K. Burns, M. Abebe, C. A. Villarruel and R. P. Moeller "Loss Mechanisms in Single Mode Fiber Tapers".
W. E. Moore, W. F. Gasko, D. W. Stowe "Mass Production of Fused Coupler Devices".

Primary Examiner—Stanley D. Miller
Assistant Examiner—B. P. Davis
Attorney, Agent, or Firm—Howard G. Massung

[57] ABSTRACT

A fiber optic coupler (15) is constructed by inserting optical fibers (11, 12) into a glass tube (23). Glass frit is placed in the glass tube (23) to fill-in the space between the optical fibers (11, 12) and the glass tube (21). The tube (23) is heated at a center portion (21), which fuses the glass frit and thereby strengthens the fiber optic coupler (15) at its critical cross-section. The coupler has high efficiency and structural stability, both of which are advantageous when used with fiber optic gyroscopes.

7 Claims, 1 Drawing Sheet

FIBER OPTIC COUPLER USING FRIT

BACKGROUND OF THE INVENTION

This invention relates to fiber optic couplers for providing signal connections between plural optical fibers. More specifically, it relates to such couplers in which multiple optical fibers are fusion bonded in order to provide a distribution of signals between the fibers. An example of such a coupler would be a bidirectional access coupler for single strand fibers.

There are currently two fiber optic configurations for couplers in use. One is a serial distribution system that employs T-access couplers, and the other is a parallel system employing a star coupler. Both 1 dB insertion loss cable connectors and 7 dB insertion loss star couplers suitable for bundle systems have been reported in the open literature. See, for example., an article by Frank L. Thiel, Roy E. Love, and Rex L. Smith in the "Journal of Applied Optics", Volume 13, page 240 (1974); and an article by M. C. Hudson and F. L. Thiel, "Journal of Applied Optics", Volume 13, page 2540 (1974).

It can be shown that generally the signal level advantage of the star format over the serial format increases as the number of terminals in the system increases. The advantage is more pronounced the higher the insertion loss of both the cable connectors and the access couplers. It is, however, relatively insensitive to the insertion loss of the star coupler. Systems which employ single fibers as a communication channel do not suffer from a packing fracture problem, and both the cable connectors and the access couplers can, in principle, be fabricated with extremely low insertion losses. The serial distribution format for a single strand fiber system can be assembled to serve a modest number of remote terminals without consuming an unreasonable portion of the available power budget from normally used sending and receiving equipment.

An example of a single strand coupler is found in U.S. Pat. No. 4,054,366, to Brnoski, et al. U.S. Pat. No. 3,579,316, to Dyott, et al., shows the use of a capillary tube having an appropriate infractive index, for forming an optical waveguide coupler. Such a capillary tube is heated so that part of the tube falls to a diameter which is substantially equal to that of the intended waveguide. One significant problem with such couplers is that it is necessary to account for a weakening of the fiber optic system at the location of the fusion. Since the capillary tube is reduced in thickness, the point of fusion becomes particularly weak and may easily fracture. Furthermore, it is necessary to provide strain relief for the optical fibers in order to prevent the coupler from fracturing the optical fibers when the coupler is placed into service.

Accordingly, it is desired to provide a process to control the manufacture of a fiber optic component which transfers or splits optical energy traveling through one fiber optic waveguide into two waveguides.

SUMMARY OF THE INVENTION

The fabrication of a fiber optic coupler is performed by preparing two identical fiber waveguides by removing their buffer coating located at desired coupling locations. The fibers are then inserted into a capillary tube which has been packed with glass frit. The fibers are positioned such that their coupling locations are covered by the capillary tube. This portion of the assembly is heated to a working point. The assembly is monitored and when the desired amount of light is observed coupled between two fibers, the heat source is removed and the process complete.

The fiber, frit and capillary tube are pre-selected for their optical and physical properties to achieve the aforementioned objectives in a cost effective manner. The fibers are prepared by stripping the buffer coatings using means commonly known in the field. The fibers are then inserted into a capillary tube which has been prefilled with glass frit. The assembly is then heated. The heat softens the capillary tube, fuses the frit and softens the fiber, whereby a combination of surface energy of the medium and externally applied forces reduce the diameters of the fibers and bring them into the necessary proximity. This provides the means by which the optical energy is partially transferred between the optical waveguides.

The advantages of this invention are the introduction of the capillary forces associated with the heated frit to economically control the positioning and provide optical characteristics to achieve desired performance. Previous manufacturing techniques required extensive manual art, including in some instances the need to introduce a twist into the fiber. In addition to the aforementioned advantages, the assembly provides a means of mechanical support for the fibers as well as strengthening an otherwise fragile component. Previous components had to be immediately reinforced due to their fragile nature, whereas, with this method reinforcement occurs with the coupling process. This invention provides ease of manufacture as well as its economical manufacture cost due to ease of handling, low cost and readily available components (i.e. frit and capillaries) and short assembly time resulting from its ease of handling. The invention has particular application in the manufacture of fiber optic gyroscopes.

DETAILED DESCRIPTION OF THE PREFERRED EMBODIMENT

Figure 1:
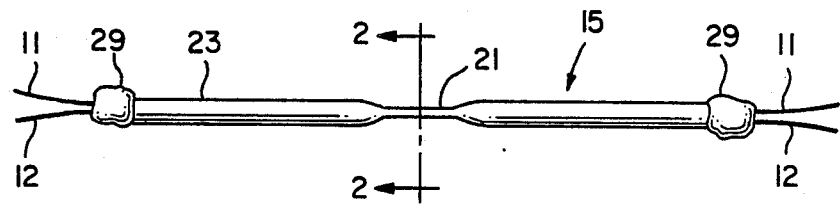
FIG. 1 shows an assembled fiber optic coupler, made in accordance with the preferred embodiment of the invention.
Figure 2:
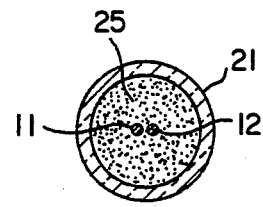
FIG. 2 is a view, taken along section 2—2 of FIG. 1, of the coupler of FIG. 1.

FIG. 1 shows an arrangement by which two optical fibers 11, 12 are joined by a coupler 15 in order that transmissions through the one fiber are transferred to the other. The present embodiment shows a pair of fibers 11, 12 which are joined to form a four way coupler, although it is possible to use the inventive techniques to join more fibers. Furthermore, it is possible to establish a connection between two or more fiber ends, wherein the fiber ends are joined by the coupler 15.

The fibers 11, 12 are sometimes referred to as fiber optic waveguides and typically consist of a single strand optical fiber called the core, covered by a buffer coating. The optical fiber strand and the buffer coating have indices of refraction which cause a light to be guided along the optical fiber in a manner wellknown in the art of fiber optics. While a small portion of the light is carried by the buffer, most of the light is carried by the optical fiber strand.

In preparing the coupler 15, a portion of the buffer coating is removed from each of the fibers 11, 12 at locations corresponding to a center section 21 of the coupler 15. The fibers 11, 12 are inserted into a capillary tube 23 so that the stripped locations of the fibers 11, 12 are centered at a desired portion 21 of the capillary tube 23. At that time, the center portion 21 is of the same diameter as the remainder of the capillary tube 23 and the tube 23 has not yet been necked down.

The capillary tube 23 is then packed with glass frit 25, which is powdered glass having an index of refraction which preferrably is lower than the index of refraction of the cores of the optical fibers 11, 12. The capillary tube 23 is then heated at the center portion 21. This causes the center portion 21 of the capillary tube to neck down. This heating causes the glass frit 25 to fuse together and to fuse to the capillary tube 23 at the center section 21. This fused glass frit reinforces the optical fibers 11, 12 at the coupling and stabilizes the coupling 15.

When this procedure was tested, a hydrogen-oxygen torch was used to heat the center section 21. The glass frit appeared to begin to melt before the capillary tube 23 became excessively deformed. This resulted in the desired neck-down appearance of the capillary tube 23. The optical strands 11, 12 remained substantially intact, permitting the coupling 15 to maintain a high efficiency. The capillary tube 23 had a nominal outside diameter of 1.5 mm although different sizes of capillary tubes are anticipated to be effective when used with the present invention. The glass frit which we used had a mesh size of mesh no. 325, or 45 microns.

After the glass frit 25 had been fused at the center section 21, the remaining glass frit (outside of the center section 21), which had not fused, was removed and the capillary tube 23 was sealed at each end by silicone epoxy bonding agent 29. The silicone epoxy 29 stabilized the fibers 11, 12 with respect to the capillary tube 23 and provided additional strain relief for the fibers 11, 12.

While a specific experimental construction of the invention has been described, it is anticipated that variations to the described invention may also be appropriate. Accordingly, the invention should be read as limited only by the claims.

We claim:

1. Fiber optic coupler characterized by:
   (a) at least two optical fibers juxtaposed at portions of the fibers corresponding to a desired optical coupling, the fibers each having a core and a buffer coating;
   (b) the buffer coating being removed from the optical fibers at the set portions corresponding to the optical coupling;
   (c) a glass tube section surrounding the fibers at the said portion corresponding to the optical coupling; and
   (d) fused glass frit surrounding the optical fibers at said portions corresponding to the optical coupling and interposed between the glass tube and the optical fibers.

2. Fiber optic coupler as described in claim 1, further characterized by:
   the glass frit being further fused to the glass tube.

3. Fiber optic coupler as described in claim 2, further characterized by:
   the glass tube being provided with strain relief means at ends of the glass tube, the strain relief means being secured to the optical fibers and the glass tube.

4. Method for assembling a fiber optic coupler characterized by:
   (a) providing a pair of optical fibers each having a core and a buffer coating;
   (b) selecting portions of the optical fibers to correspond to an optical coupling;
   (c) removing the buffer coating from the fibers at said portions;
   (d) inserting the optical fibers into a glass tube and aligning the fibers so that the said portions are in an optical alignment with one another and at a desired section of the glass tube;
   (e) inserting glass frit into the glass tube so that the glass frit fits in a space between the glass tube and said portions of the optical fibers; and
   (f) heating the tube sufficiently to fuse the glass frit.

5. Method as described in claim 4, further characterized by:
   the heating of the tube being sufficient to fuse the glass frit to the tube.

6. Method as described in claim 5, further characterized by:
   further securing the optical fibers to the glass tubes at ends of the glass tube.

7. Method as described in claim 5, further characterized by:
   providing, strain relief for the optical fibers at ends of the glass tube by applying an epoxy bonding agent to the ends of the glass tube.

* * * * *